(12) United States Patent
Bagheri et al.

(10) Patent No.: US 12,502,969 B2
(45) Date of Patent: Dec. 23, 2025

(54) METHOD AND APPARATUS FOR MONITORING ELECTRIC MOTOR SYSTEM

(71) Applicant: Volvo Truck Corporation, Gothenburg (SE)

(72) Inventors: Azam Bagheri, Gothenburg (SE); Atabak Taheri, Angelholm (SE)

(73) Assignee: Volvo Truck Corporation, Gothenburg (SE)

(*) Notice: Subject to any disclaimer, the term of this patent is extended or adjusted under 35 U.S.C. 154(b) by 163 days.

(21) Appl. No.: 18/490,126

(22) Filed: Oct. 19, 2023

(65) Prior Publication Data
US 2024/0149693 A1    May 9, 2024

(30) Foreign Application Priority Data

Nov. 3, 2022 (EP) .................................. 22205390

(51) Int. Cl.
*B60L 3/00* (2019.01)
*G01R 31/34* (2020.01)

(52) U.S. Cl.
CPC ............ *B60L 3/0061* (2013.01); *B60L 3/003* (2013.01); *B60L 2210/42* (2013.01); *B60L 2240/526* (2013.01)

(58) Field of Classification Search
CPC .... B60L 3/0061; B60L 3/003; B60L 2210/42; B60L 2240/526; G01R 31/34; G01R 31/42
See application file for complete search history.

(56) References Cited

U.S. PATENT DOCUMENTS

| | | | |
|---|---|---|---|
| 2016/0216332 A1* | 7/2016 | Gajanayake | G01R 31/42 |
| 2020/0059184 A1* | 2/2020 | Ghaderi | H02P 21/30 |

OTHER PUBLICATIONS

Extended European Search Report mailed Apr. 14, 2023 for European Patent Application No. 22205390.2, 8 pages.
Aydin, Ilhan et al.; "A new real-time fuzzy logic based diagnosis of stator faults for inverter-fed induction motor under low speeds", 2016 IEEE 14th International Conference on Industrial Informatics (INDIN), IEEE, Jul. 19, 2016, pp. 446-451, XP033043943.
Hameed, Armughan et al: "A Park's vector approach using process monitoring statistics of principal component analysis for machine fault detection", 2016 International Conference on Emerging Technologies (ICET), IEEE, Oct. 18, 2016, pp. 1-5, XP033041223.
Aydin, Ilhan et al: "An adaptive artificial immune system for fault classification", Journal of Intelligent Manufacturing, Kluwer Academic Publishers, BO, vol. 23, No. 5, Aug. 19, 2010, pp. 1489-1499, XP035112181.
Fernandez Gomez, Alejandro J et al: "Fault detection in electric motors by means of the extended Kalman Filter as disturbance estimator", 2014 UKACC International Conference on Control, IEEE, Jul. 9, 2014, pp. 432-437, XP032654531.

* cited by examiner

*Primary Examiner* — Tan Q Nguyen
(74) *Attorney, Agent, or Firm* — Sage Patent Group

(57) ABSTRACT

A method and an apparatus are provided to monitor an electric motor drive system. Samples of a three-phase current waveform associated with the electric motor system are obtained. The samples of the three-phase current waveform are transformed into two orthogonal signals. A covariance matrix is generated from the two orthogonal signals. A fault type and a fault location in the electric motor system is determined based on the covariance matrix.

20 Claims, 13 Drawing Sheets

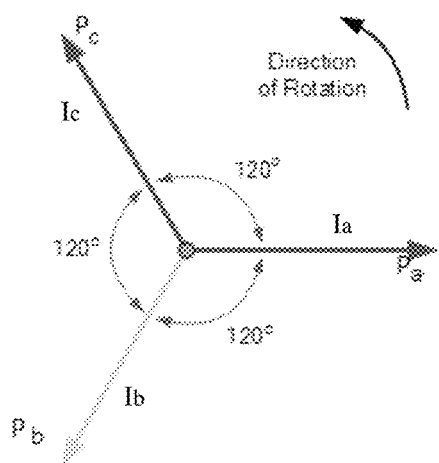
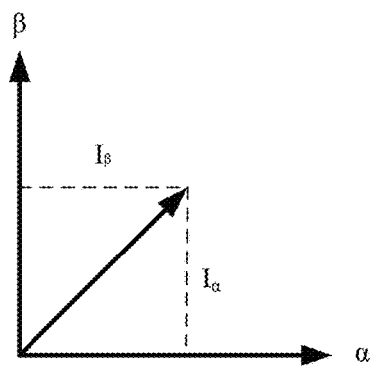
FIGURE 4B
FIGURE 4A
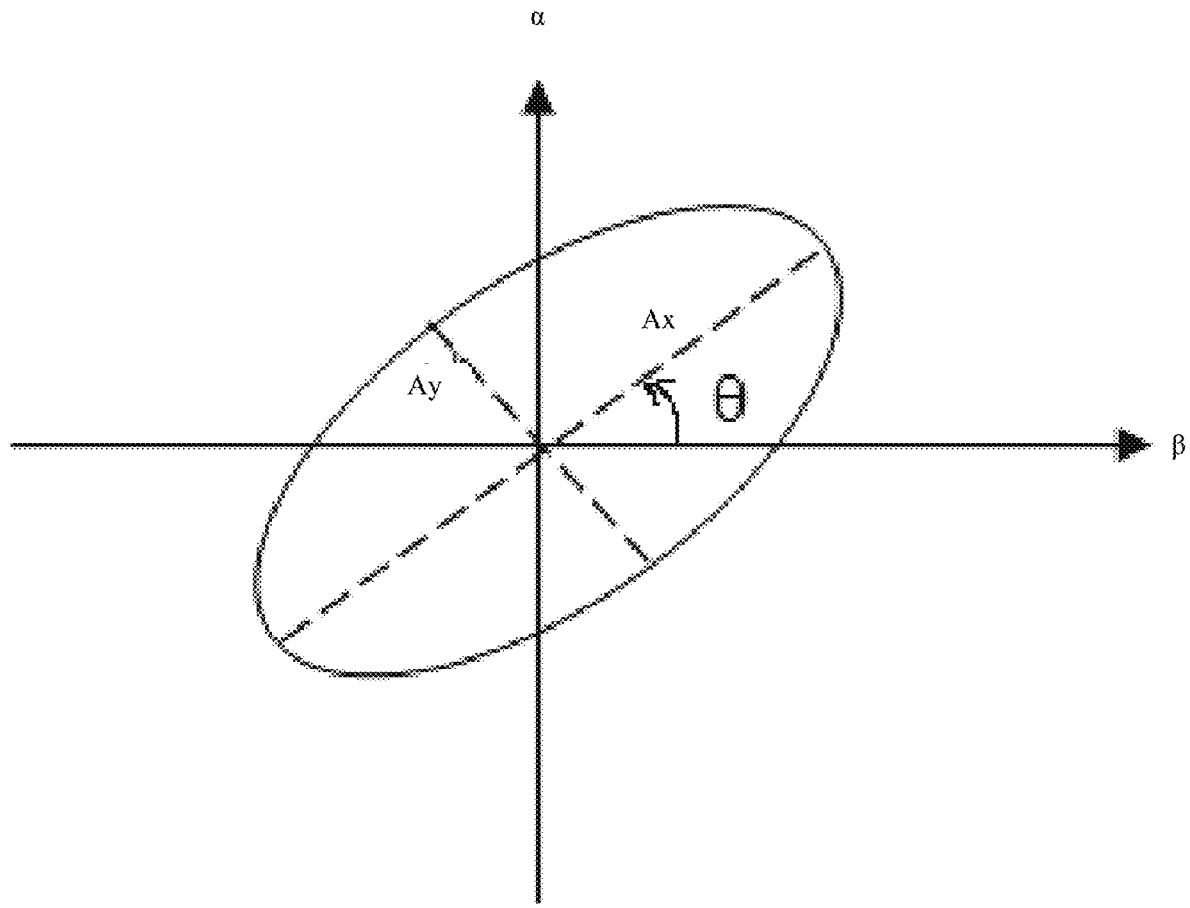
FIGURE 4C

METHOD AND APPARATUS FOR MONITORING ELECTRIC MOTOR SYSTEM

TECHNICAL FIELD

The present disclosure relates generally to a vehicle system. In particular aspects, the present disclosure relates to a method and an apparatus for monitoring an electric motor system. The present disclosure can be applied in heavy-duty vehicles, such as trucks, buses, and construction equipment. Although the present disclosure may be described with respect to a particular vehicle, the present disclosure is not restricted to any particular vehicle.

BACKGROUND

Two common failures of an electric motor system are the stator winding insulation failure inside an electric motor and switch failure inside an inverter. Increased temperature inside a stator case may cause stator winding insulation failure, which may result in unbalanced currents within the stator windings. The increased temperature may melt down the insulation between the stator windings and lead to short circuits between the stator windings. As switches of an inverter age, due to high switching frequency, either short circuit or open circuit failures may be induced. However, it may be difficult for a current detecting system to detect these motor stator failures and inverter switch failures. Moreover, even when a fault is detected, it may be difficult for a current detecting system to determine a type and/or a location of the fault.

SUMMARY

According to a first aspect of some embodiments of inventive concepts, a method for monitoring an electric motor system is provided. The method may include performing operations. First, samples of a three-phase current waveform associated with the electric motor system may be obtained. Then, the samples of the three-phase current waveform may be transformed into two orthogonal signals. A covariance matrix may be generated from the two orthogonal signals. A fault type and a fault location may be determined in the electric motor system based on the covariance matrix.

According to a second aspect of some embodiments of inventive concepts, an apparatus for monitoring an electric motor system is provided. The apparatus may include a processor and a memory coupled to the processor. The memory may store computer-executable instructions that, when executed by the processor, may cause the apparatus to perform operations. First, samples of a three-phase current waveform associated with the electric motor system may be obtained. Then, the samples of the three-phase current waveform may be transformed into two orthogonal signals. A covariance matrix may be generated from the two orthogonal signals. A fault type and/or a fault location may be determined in the electric motor system based on the covariance matrix.

The first and second aspects of the disclosure may seek to monitor an electric motor system. A technical benefit may include that a fault type and/or a fault location in an electric motor system may be determined based on a covariance matrix generated from orthogonal signals transformed from a three-phase current waveform associated with the electric motor system. Accordingly, there is no time delay because there is no filtering, when a waveform instead of a phase is used.

In some examples, the samples of the three-phase current waveform may include samples from a complete cycle of a fundamental frequency of the three-phase current waveform. A technical benefit may include that there is no time delay because there is no filtering, when a waveform instead of a phase is used.

In some examples, it may further include generating an alert indicating the fault type and/or the fault location. A technical benefit may include early detection of failures of the electric motor system and avoiding unwanted vehicle downtime.

In some examples, transforming the samples of the three-phase current waveform into the matrix of the two orthogonal signals may include applying a Clarke transformation to the samples of the three-phase current waveform. A technical benefit may include that there is no time delay because there is no filtering, when a waveform instead of a phase is used.

In some examples, the three-phase current waveform may include three current components, each current component corresponds to a respective phase of the three-phase current waveform. A technical benefit may include that there is no time delay because there is no filtering, when a waveform instead of a phase is used.

In some examples, determining the fault type and/or the fault location in the electric motor system based on the covariance matrix may include determining the fault type and/or the fault location in the electric motor system based on eigenvalues of the covariance matrix. A technical benefit may include that a fault type and/or a fault location in an electric motor system may be determined based on eigenvalues of a covariance matrix generated from orthogonal signals transformed from a three-phase current waveform associated with the electric motor system. Accordingly, there is no time delay because there is no filtering, when a waveform instead of a phase is used.

In some examples, determining the fault type and/or the fault location in the electric motor system based on the eigenvalues of the covariance matrix may include determining the fault type and/or the fault location in the electric motor system based on a rotation angle of an ellipse in an $\alpha$-$\beta$ plane (polar plane), and the ellipse is generated by plotting the eigenvalues in the $\alpha$-$\beta$ plane. A technical benefit may include that a fault type and/or a fault location in an electric motor system may be determined based on a rotation angle of an ellipse generated by plotting the eigenvalues in an $\alpha$-$\beta$ plane where the eigenvalues of a covariance matrix is generated from orthogonal signals transformed from a three-phase current waveform associated with the electric motor system. Accordingly, there is no time delay because there is no filtering, when a waveform instead of a phase is used.

In some examples, the three-phase current waveform may include three current components, each current component corresponds to a respective phase of the three-phase current waveform, the fault type and/or the fault location in the electric motor system may include an unbalanced condition of stator currents in an electric motor of the electric motor system, the three current components may include the stator currents in the electric motor, and the unbalanced condition is determined based on the rotation angle. A technical benefit may include that there is no time delay because there is no filtering, when a waveform instead of a phase is used.

In some examples, it may further include determining a fault severity of the unbalanced condition based on values of a positive sequence component and a negative sequence component, the positive sequence component and the negative sequence component are generated based on the eigenvalues. A technical benefit may include that there is no time delay because there is no filtering, when a waveform instead of a phase is used.

In some examples, it may further include generating an alert indicating the fault severity. A technical benefit may include early detection of failures of the electric motor system and avoiding unwanted vehicle downtime.

In some examples, the alert is generated in response to the fault severity being greater than a threshold level. A technical benefit may include early detection of failures of the electric motor system and avoiding unwanted vehicle downtime.

In some examples, the unbalanced condition is determined further based on a length of a semi-minor axis of the ellipse and a length of a semi-major axis of the ellipse. A technical benefit may include that there is no time delay because there is no filtering, when a waveform instead of a phase is used.

In some examples, the three-phase current waveform may include three current components, each current component corresponds to a respective phase of the three-phase current waveform, the fault type and/or the fault location in the electric motor system may include a fault type and/or a fault location in an electric motor of the electric motor system, and the three current components may include stator currents in the electric motor. A technical benefit may include early detection of failures of an electric motor of the electric motor system and avoiding unwanted vehicle downtime.

In some examples, determining the fault type and/or the fault location in the electric motor system based on the eigenvalues of the covariance matrix may include determining the fault type and/or the fault location in the electric motor system further based on quadrants occupied by the ellipse in the αβ plane. A technical benefit may include that that there is no time delay because there is no filtering, when a waveform instead of a phase is used.

In some examples, the three-phase current waveform may include three current components, each current component corresponds to a respective phase of the three-phase current waveform, the fault type and/or the fault location in the electric motor system may include a short circuit or open circuit failure mode of an inverter of the electric motor system, the three current components may include terminal currents in the inverter, and the short circuit or open circuit failure mode is determined based on the rotation angle and the quadrants occupied by the ellipse in the α-β plane. A technical benefit may include early detection of failures of an inverter of the electric motor system and avoiding unwanted vehicle downtime.

In some examples, the three-phase current waveform may include three current components, each current component corresponds to a respective phase of the three-phase current waveform, the fault type and/or the fault location in the electric motor system may include a fault type and/or a fault location in an inverter of the electric motor system, and the three current components may include terminal currents in the inverter. A technical benefit may include that there is no time delay because there is no filtering, when a waveform instead of a phase is used.

In some examples, the electric motor system includes an inverter and an electric motor, and the inverter is for converting a direct current (DC) voltage to a three-phase alternating current (AC) voltage for powering the electric motor. A technical benefit may include early detection of failures of an inverter and an electric motor of the electric motor system and avoiding unwanted vehicle downtime.

In some examples, an inverter may include the apparatus as recited above. A technical benefit may include early detection of failures of an inverter of the electric motor system and avoiding unwanted vehicle downtime.

In some examples, an electric motor system may include an inverter configured to convert a direct current (DC) voltage into a three-phase alternating current (AC) voltage, a three-phase electric motor coupled to the inverter and configured to generate mechanical rotation in response to the three-phase AC voltage, and the apparatus as recited above coupled to the inverter and the three-phase electric motor. A technical benefit may include early detection of failures of an inverter and an electric motor of the electric motor system and avoiding unwanted vehicle downtime.

In some examples, an electric motor drive system configured to drive a three-phase electric motor that generates mechanical rotation in response to a three-phase alternating current (AC) voltage may include an inverter configured to convert a direct current (DC) voltage into the three-phase alternating current (AC) voltage, and a predictive maintenance unit coupled to the inverter and the three-phase electric motor and configured to perform the method as recited above. A technical benefit may include early detection of failures of an inverter and an electric motor of the electric motor system and avoiding unwanted vehicle downtime.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts Like numbers in the figures refer to like operations and like components. In the drawings:

FIG. 4A is an exemplary schematic diagram illustrating phasors of three current components of a three-phase current waveform associated with an electric motor system in an abc plane according to some embodiments of inventive concepts;

FIG. 4B is an exemplary schematic diagram illustrating two orthogonal signals transformed from three current components of a three-phase current waveform associated with an electric motor system in an αβ plane according to some embodiments of inventive concepts;

FIG. 4C is an exemplary schematic diagram illustrating a rotation angle, a semi-minor axis and a semi-major axis of an ellipse in an α-β plane according to some embodiments of inventive concepts;

DETAILED DESCRIPTION

Aspects set forth below represent the necessary information to enable those skilled in the art to practice the disclosure.

Motor stator failures and inverter switch failures may be detected with a type and/or a location of their fault in an electric motor system may be determined based on a covariance matrix generated from orthogonal signals transformed from a three-phase current waveform associated with the electric motor system.

Figure 1A:
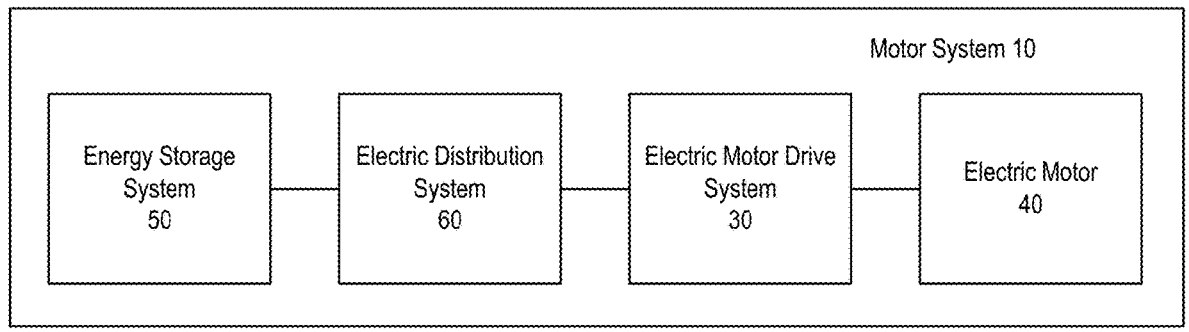
FIG. 1A is an exemplary schematic diagram illustrating components of a motor system according to some embodiments of inventive concepts.
Figure 1B:
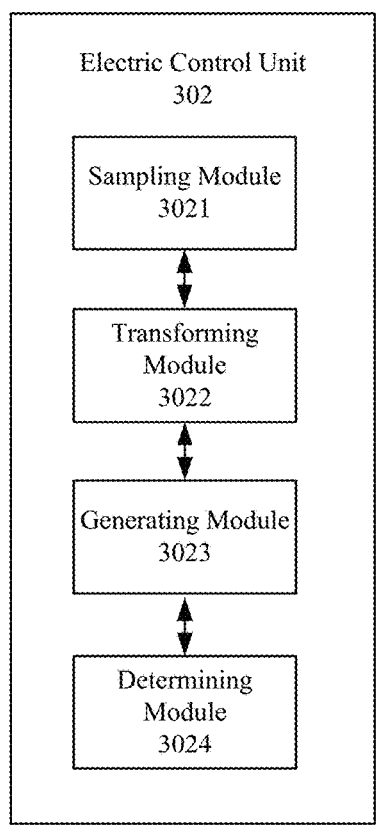
FIG. 1B is an exemplary schematic diagram illustrating components of an electric control unit according to some embodiments of inventive concepts.
Figure 1C:
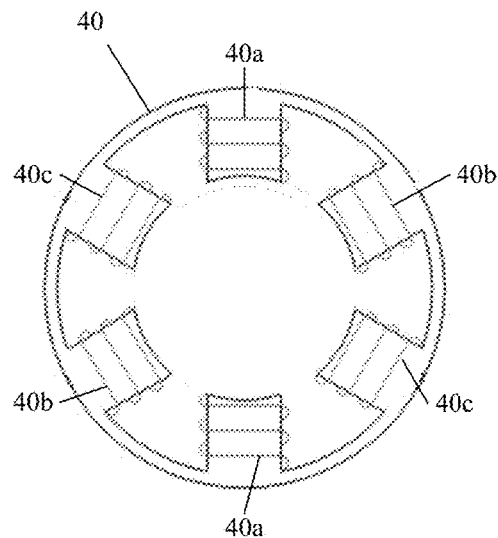
FIG. 1C is an exemplary schematic diagram illustrating components of an electric motor according to some embodiments of inventive concepts.

Referring now to FIGS. 1A and 1C, an electric motor system 10 includes an electric motor 40. An energy storage system 50, such as a DC-link capacitor, supplies energy to an electric motor drive system 30 via an electric distribution system 60. The electric motor 40, the electric motor drive system 30, electric distribution system 60 and the energy storage system 50 may be integrated in the electric motor system 10.

Figure 2:
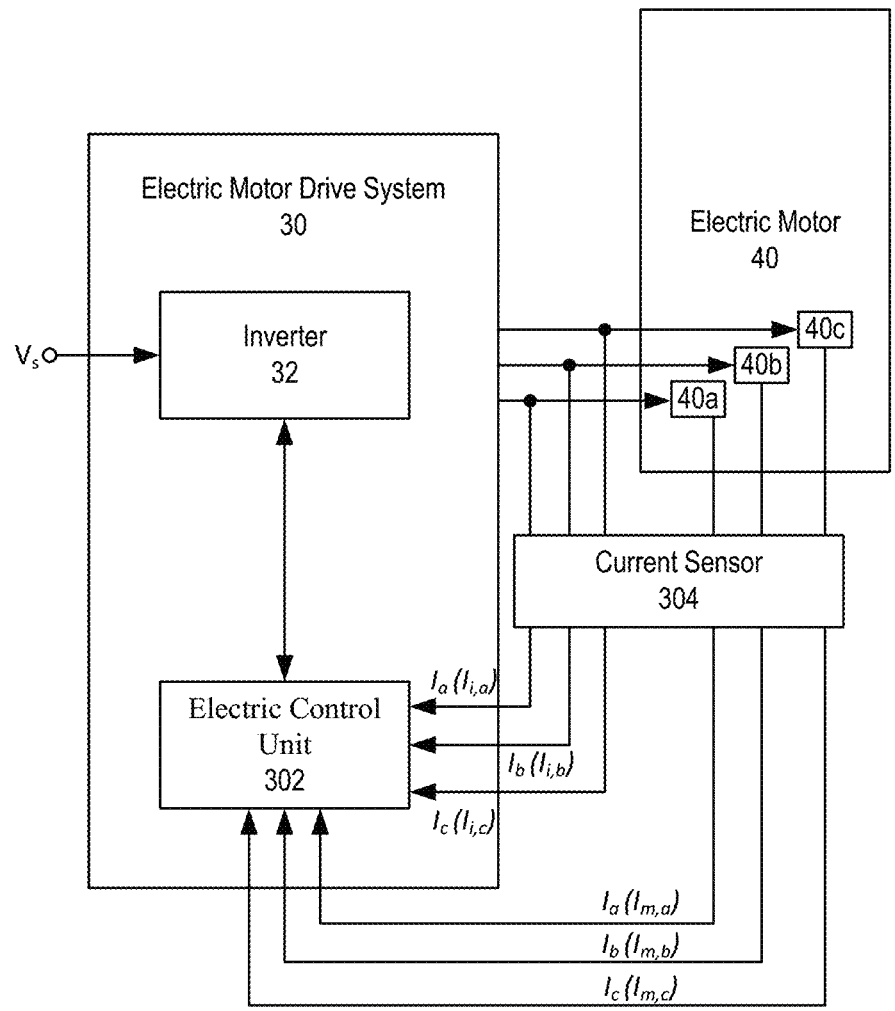
FIG. 2 is an exemplary schematic diagram illustrating components of an electric motor drive system for monitoring a motor system according to some embodiments of inventive concepts.

Referring to FIG. 2, an electric motor drive system 30 according to some embodiments may include an inverter 32 that converts a direct current (DC) voltage Vs into a three-phase alternating current (AC) voltage. The three-phase AC voltage drives the electric motor 40 to generate mechanical rotation. The electric motor 40 may be a three-phase electric motor 40 which may have three stator windings 40a, 40b, 40c, as shown in FIGS. 1C and 2-3, that may be powered via the AC voltage to generate mechanical rotation.

Still referring to FIG. 2, the electric motor drive system 30 may include an inverter 32 configured to convert the direct current (DC) voltage Vs into the three-phase alternating current (AC) voltage and an electric control unit 302 that is coupled to and controls the inverter 32. The electric control unit 302 receives electrical signals from the inverter 32 and the three-phase electric motor 40. The electric control unit 302 may be configured to perform operations of the method described below.

In particular, the inverter 32 supplies a three-phase current waveform to the electric motor 40 that includes three current components $I_{i,a}$, $I_{i,b}$ and $I_{i,c}$. The inverter current components are detected, through a current sensor 304 of the electric motor drive system 30, by the electric control unit 302, which analyzes the inverter current components as described below to identify a fault in the inverter 32. Based on the analysis of the inverter current components, the electric control unit 302 may determine a fault type and/or a fault location of the fault as described in more detail below.

Figure 3:
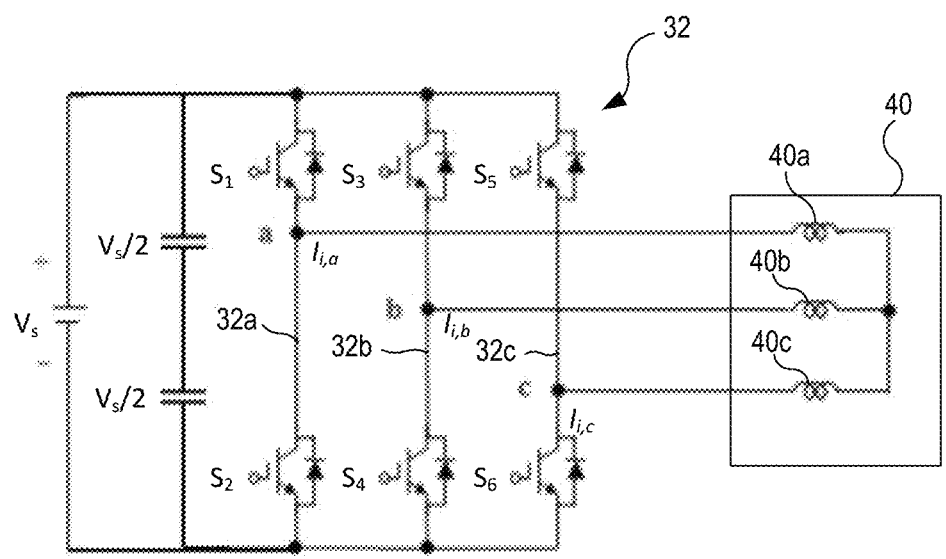
FIG. 3 is an exemplary schematic diagram illustrating an inverter electrically coupled with an electric motor according to some embodiments of inventive concepts.

For example, brief reference is made to FIGS. 1C and 3, which is a schematic circuit diagram that illustrates certain aspects of the inverter 32 and the electric motor 40. As shown therein, the inverter 32 receives a DC voltage Vs and converts it to the three-phase current waveform to the electric motor 40 that includes three current components $I_{i,a}$, $I_{i,b}$ and $I_{i,c}$ via an array of switches $S_1$-$S_6$, which are arranged in pairs on legs 32a, 32b, 32c in the inverter 32. By analyzing the inverter current components as described herein, the electric control unit 302 can detect a type of failure in the inverter 32 (e.g., short circuit or open circuit) and can detect a location of the failure in the inverter 32 (e.g., which switch has failed).

In the schematic circuit diagram of FIGS. 1C and 3, the electric motor 40 is modeled as three inductive loads, that represent the stator windings 40a, 40b, 40c of the motor 40. Each current component of a three phase motor current (including current components $I_{m,a}$, $I_{m,b}$, $I_{m,c}$) flows through a respective one of the stator windings 40a, 40b, 40c.

Referring again to FIGS. 1C and 2, the electric control unit 302 may detect, via a current sensor 304, the motor current components $I_{m,a}$, $I_{m,b}$, $I_{m,c}$ flowing in the three stator windings 40a, 40b, 40c of the electric motor 40. The motor current components $I_{m,a}$, $I_{m,b}$, $I_{m,c}$ are analyzed by the electric control unit 302 as described below to identify a fault in the electric motor 40. Based on the analysis of the motor current components $I_{m,a}$, $I_{m,b}$, $I_{m,c}$ the electric control unit 302 may determine a fault type and/or a fault location of the fault as described in more detail below. For example, by analyzing the motor current components $I_{m,a}$, $I_{m,b}$, $I_{m,c}$ as described herein, the electric control unit 302 can detect a failure in the electric motor 40 (e.g., an insulation failure) and can detect a location of the failure (e.g., which stator winding has failed).

Figure 13:
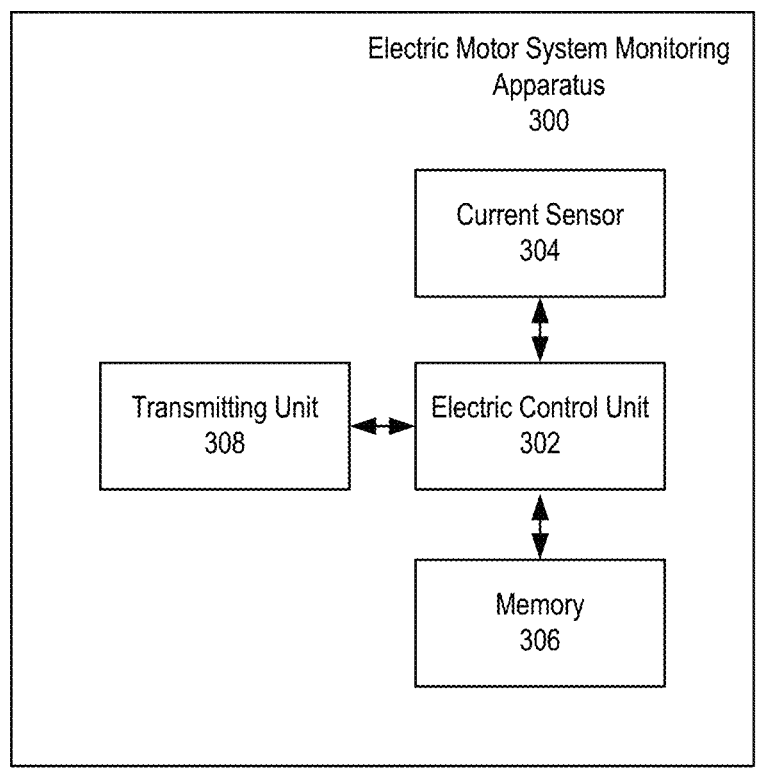
FIG. 13 is an exemplary schematic diagram illustrating components of an apparatus for monitoring an electric motor system according to some embodiments of inventive concepts.

Referring to FIG. 4A, three phasors Pa, Pb, Pc are illustrated. A phasor is a complex number representing a sinusoidal function whose amplitude, angular frequency, and initial phase are time-invariant. Each of the phasors Pa, Pb, Pc corresponds to a respective component $I_a$, $I_b$, and $I_c$ of a three-phase current waveform. The three current components $I_a$, $I_b$ and $I_c$ may be detected and obtained by using the current sensor 304 (FIGS. 2 and 13). In a normal (balanced) condition, the three phasors Pa, Pb, Pc may have the same magnitude with 120° phase shifts therebetween. For instance, the three current components $I_a$, $I_b$ and $I_c$ may represent either terminal currents $I_{i,a}$, $I_{i,b}$ and $I_{i,c}$ from the inverter 32 or stator currents $I_{ma}$, $I_{m,b}$ and $I_{m,c}$ from the electric motor 40, as shown in FIG. 2.

According to some embodiments, the electric control unit 302 may comprise a transforming module 3022, a generating module 3023, and a determining module 3024, as shown in FIG. 1B. Samples of a three-phase current waveform may be transformed, via the transforming module 3022 of the electric control unit 302, into a matrix of two orthogonal signals $I_\alpha$ and $I_\beta$ using an α-β transformation as shown in FIG. 4B. A covariance matrix may be generated, via the generating module 3023 of the electric control unit 302, from the matrix of the two orthogonal signals $I_\alpha$ and $I_\beta$, and a fault type and/or a fault location in the electric motor system 10 may be determined, via the determining module 3024 of the electric control unit 302, based on the covariance matrix. Accordingly, a waveform is needed while a phase is not required, such that there is no time delay because there is no filtering. In some embodiments, an alert may be generated, via the generating module 3023 of the electric control unit 302, to indicate the fault type and/or the fault location. Additionally, a fault severity in the electric motor system 10 may further be determined, via the determining module 3024 of the electric control unit 302. Furthermore, the alert may indicate the fault severity when the fault severity may be greater than a threshold level. Thereafter, the alert may be transmitted to a user or an operator via a transmitting unit 308 of the electric motor drive system 30, such as a display or a speaker.

According to some embodiments, the samples of a three-phase current waveform may include samples from a complete cycle of a fundamental frequency of the three-phase current waveform. The samples of the three-phase current waveform may be transformed, via the transforming module 3022 of the electric control unit 302, into the matrix of the two orthogonal signals $I_\alpha$ and $I_\beta$ by applying a Clarke transformation to the samples of the three-phase current waveform. In particular, the Clarke transformation may be applied to the samples of the three-phase current waveform according to Equation [1]:

$$A = [I_\alpha \ I_\beta] = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} I_a \\ I_b \\ I_c \end{bmatrix} \quad [1]$$

where $I_a$, $I_b$ and $I_c$ represent the three current components of the three-phase current waveform, $I_\alpha$ and $I_\beta$ represent the two orthogonal signals, and A represents the matrix of the two orthogonal signals $I_\alpha$ and $I_\beta$. The matrix A has dimensions [N×2], where N is the number of samples in one cycle of the current components. For example, if the sampling frequency is 10 kHz and the fundamental frequency of a current component is 50 Hz, then N=200.

A covariance matrix may then be generated, via the generating module 3023 of the electric control unit 302, from the matrix $A=[I_\alpha I_\beta]$ according to Equation [2]:

$$B = \mathrm{cov}(A) \quad [2]$$

Eigenvalues $\gamma_1$ and $\gamma_2$ of the covariance matrix B may be obtained, via the generating module 3023 of the electric control unit 302, and the fault type and/or the fault location in the electric motor system 10 may be determined, via the determining module 3024 of the electric control unit 302, based on the eigenvalues $\gamma_1$ and $\gamma_2$ of the covariance matrix.

Moreover, determining the fault type and/or the fault location in the electric motor system 10 based on the eigenvalues $\gamma_1$ and $\gamma_2$ of the covariance matrix may include determining the fault type and/or the fault location in the electric motor system 10 based on a rotation angle θ of an ellipse in an α-β plane that is generated by plotting the orthogonal signals $I_\alpha$ and $I_\beta$ in the α-β plane. Specifically, the rotation angle θ of the ellipse may be determined according to Equation [3]:

$$\theta = \tan^{-1}\left(\frac{\gamma_2}{\gamma_1}\right) \quad [3]$$

where θ represents the rotation angle, and $\gamma_1$ and $\gamma_2$ represent the eigenvalues of the covariance matrix. In the normal (balanced) condition, the Clarke transformation of the three current components may lead to the two orthogonal signals with the same magnitude, and thus a representation in the α-β plane is in the shape of circle. In an abnormal (unbalanced) condition, the representation in the α-β plane is in the shape of an ellipse.

Brief reference is made to FIG. 4C which is a schematic diagram illustrating a rotation angle θ, a semi-minor axis Ay and a semi-major axis Ax of an ellipse in an α-β plane according to some embodiments.

Figure 5A:
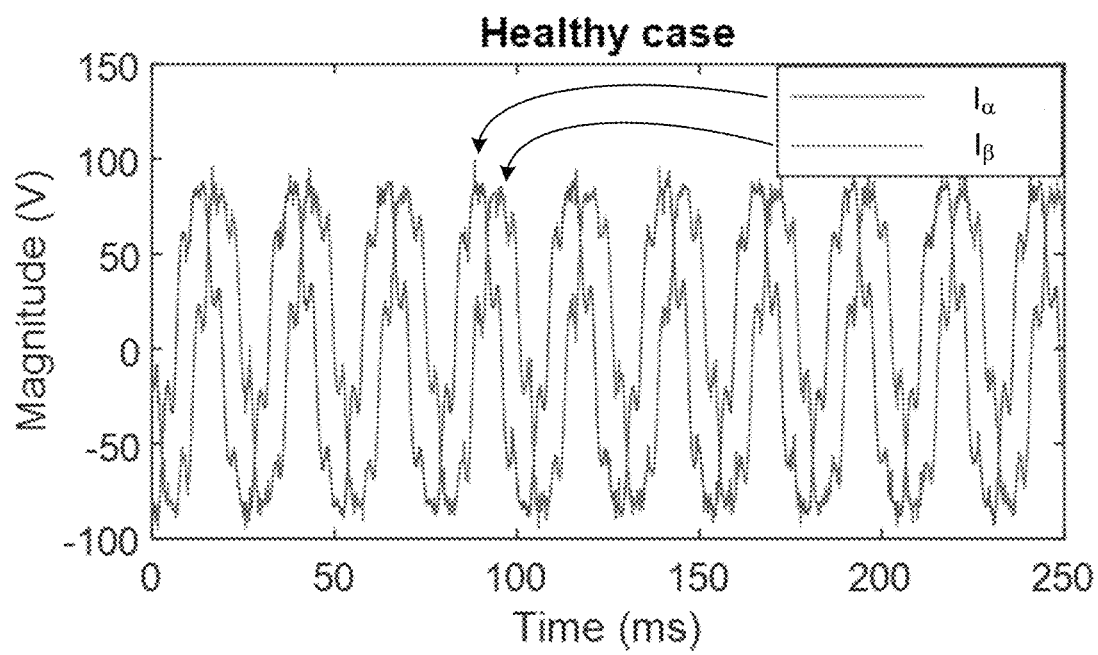
FIG. 5A is an exemplary schematic diagram illustrating magnitudes of alpha-beta voltage components of a healthy case of an electric motor according to some embodiments of inventive concepts.
Figure 5B:
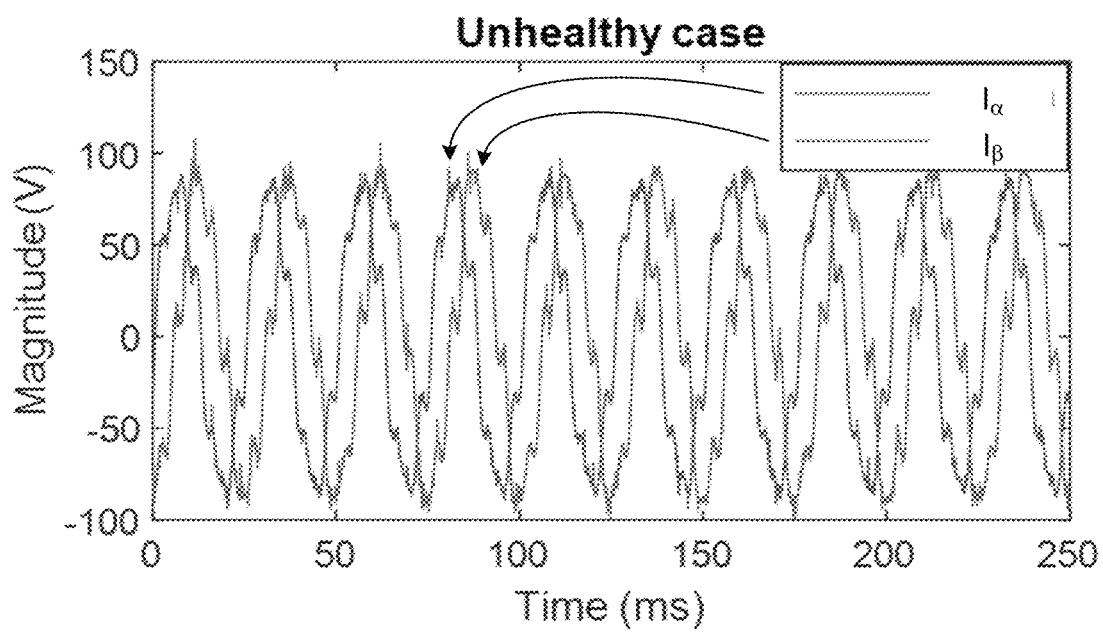
FIG. 5B is an exemplary schematic diagram illustrating magnitudes of alpha-beta voltage components of an unhealthy case of an electric motor according to some embodiments of inventive concepts.

FIG. 5A is a graph of samples of $I_a$ and $I_b$ as a function of time for the case of a "healthy" three phase signal in which all of the current components are balanced, and FIG. 5B is a graph of samples of $I_a$ and $I_b$ as a function of time for the case of an "unhealthy" three phase signal in which all of the current components are unbalanced. In the example of FIGS. 5A and 5B, a sampling frequency of 10 kHz is used and each dataset has 10 cycles. The fundamental frequency is 25 Hz, so each cycle has 400 samples. In this representation, it is difficult to distinguish the healthy case from the unhealthy case.

Figure 6:
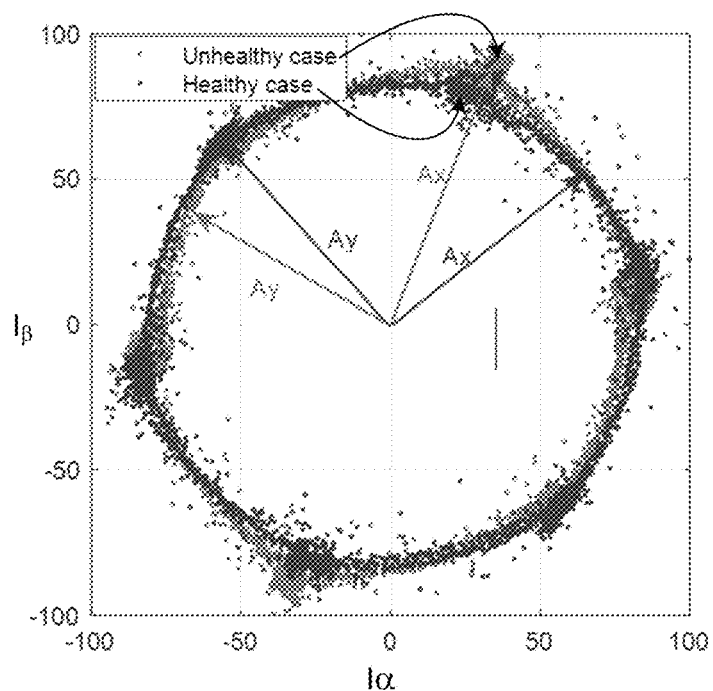
FIG. 6 is an exemplary schematic diagram illustrating representations of alpha-beta currents in an αβ plane for a healthy case and an unhealthy case according to some embodiments of inventive concepts.

Conversely, FIG. 6 is a graph of $I_b$ versus $I_a$ for the healthy case and the unhealthy case. As can be seen in FIG. 6, the graph for the healthy case is generally circular, while the graph for the unhealthy case is slightly elliptical. Thus, in the healthy case, the semi-minor axis Ay and the semi-major axis Ax of the graph are approximately equal, while in the unhealthy case, the semi-minor axis Ay and the semi-major axis Ax of the graph are unequal. The rotation angle θ of the ellipse may be determined, via the determining module 3024 of the electric control unit 302, from the eigenvalues $\gamma_1$ and $\gamma_2$ of the covariance matrix B according to Equation [3].

The method may further include determining, via the determining module 3024 of the electric control unit 302, a fault severity of the unbalanced condition based on values of a positive sequence component $I_1$ and a negative sequence component $I_2$. The positive sequence component $I_1$ and the negative sequence component $I_2$ may be generated, via the generating module 3023 of the electric control unit 302, based on the eigenvalues $\gamma_1$ and $\gamma_2$. Specifically, the positive sequence component $I_1$ and the negative sequence component $I_2$ may be generated, via the generating module 3023 of the electric control unit 302, according to Equations [4] and [5] as follows:

$$I_1 = \frac{\sqrt{2\gamma_1} + \sqrt{2\gamma_2}}{2} \quad [4]$$

$$I_2 = \frac{\sqrt{2\gamma_1} - \sqrt{2\gamma_2}}{2} \quad [5]$$

where $\gamma_1$ and $\gamma_2$ represent the eigenvalues of the covariance matrix, $I_1$ represents the positive sequence component, and $I_2$ represents the negative sequence component. On the other hand, in the normal (balanced) condition, the negative sequence component $I_2$ may equal to zero.

To generate the positive and negative sequences, a sliding window technique is applied. An initial window having 400 samples of data is used, and the window is moving forward with each sample.

The unbalanced condition may be determined, via the determining module 3024 of electric control unit 302, further based on a length $A_x$ of a semi-minor axis of the ellipse and a length $A_y$ of a semi-major axis of the ellipse, the semi-major axis may correspond to the positive sequence component, while the semi-minor axis may correspond to the negative sequence, wherein $A_x$ and $A_y$ may be determined according to Equations [6] and [7] as follows:

$$A_x = \sqrt{2\gamma_1} \quad [6]$$

$$A_y = \sqrt{2\gamma_2} \quad [7]$$

where $\gamma_1$ and $\gamma_2$ may represent the eigenvalues of the covariance matrix, $A_x$ may represent the length of the semi-minor axis of the ellipse, and $A_y$ may represent the length of the semi-major axis of the ellipse. Accordingly, the positive sequence component $I_1$ and the negative sequence component $I_2$ may be generated according to Equations [8] and [9] as follows:

$$I_1 = \frac{A_x + A_y}{2} \quad [8]$$

$$I_2 = \frac{A_x - A_y}{2}. \quad [9]$$

Identification of Motor Fault

In some embodiments, the fault type and/or the fault location in the electric motor system 10 may include a fault type and/or a fault location in the electric motor 40 of the electric motor system 10, the three current components $I_a$, $I_b$ and $I_c$ may include the stator currents $I_{m,a}$, $I_{m,b}$ and $I_{m,c}$ in the electric motor 40, and hence the fault type and/or the fault location in the electric motor system 10 may include an unbalanced condition of the stator currents $I_{m,a}$, $I_{m,b}$ and $I_{m,c}$, in the electric motor 40 of the electric motor system 10. The unbalanced condition of the stator currents $I_{m,a}$, $I_{m,b}$ and $I_{m,c}$ may be due to a fault either between the stator windings 40a, 40b, 40c. Specifically, the unbalanced condition may be determined, via the determining module 3024 of electric control unit 302, based on the rotation angle θ of the ellipse formed by the plot of $I_a$ vs $I_b$. For example, an unbalanced type of the unbalanced condition may be determined, via the determining module 3024 of electric control unit 302, according to Table 1. The unbalanced types are indicated in Table 2:

TABLE 1

Unbalanced Type Determination

| Unbalanced Type | θ range in ° |
|---|---|
| $D_b$ | [0, 30] |
| $C_c$ | (30, 60] |
| $D_a$ | (60, 90] |
| $C_b$ | (90, 120] |
| $D_b$ | (120, 150] |
| $C_a$ | (150, 180] |

TABLE 2

Unbalanced Type Definitions

| Unbalanced Type | Description |
|---|---|
| $D_b$ | drop in phasor Pb magnitude |
| $C_c$ | drop in phasors Pa & Pb magnitude |
| $D_a$ | drop in phasor Pa magnitude |
| $C_b$ | drop in phasors Pa & Pc magnitude |
| $D_c$ | drop in phasor Pc magnitude |
| $C_a$ | drop in phasors Pb & Pc magnitude | where θ represents the rotation angle, $D_b$, $C_c$, $D_a$, $C_b$, $D_b$ and $C_a$ represent the unbalanced types, Pa, Pb and Pc represent phasors of the three current components $I_a$, $I_b$, $I_c$ of the three-phase current waveform.

In one example, when the rotation angle θ is between 30° and 60°, it indicates a fault type of $C_c$ corresponding to a magnitude drop in phasors Pa and Pb of the three current components $I_a$, $I_b$, $I_c$ of the three-phase current waveform from the electric motor 40, i.e., the the stator currents $I_{m,a}$, $I_{m,b}$ and $I_{m,c}$. Thus, referring to FIG. 1C, the fault type $C_c$ (the stator windings 40a and 40b has drops in phasors Pa & Pb magnitude) and the fault location (the stator windings 40a and 40b) may be determined, via the determining module 3024 of electric control unit 302, based on the rotation angle θ.

Accordingly, turn-to-turn faults in electric motor stator windings, such as the stator-wining insulation failure inside the electric motor 40 and its severity due to short circuits of the stator windings caused by increased temperature inside a stator casing which may melt down winding insulation, may be determined, via the determining module 3024 of electric control unit 302, in real-time, so as to reduce or avoid unwanted vehicle downtime by performing maintenance service in advance.

Figure 7:
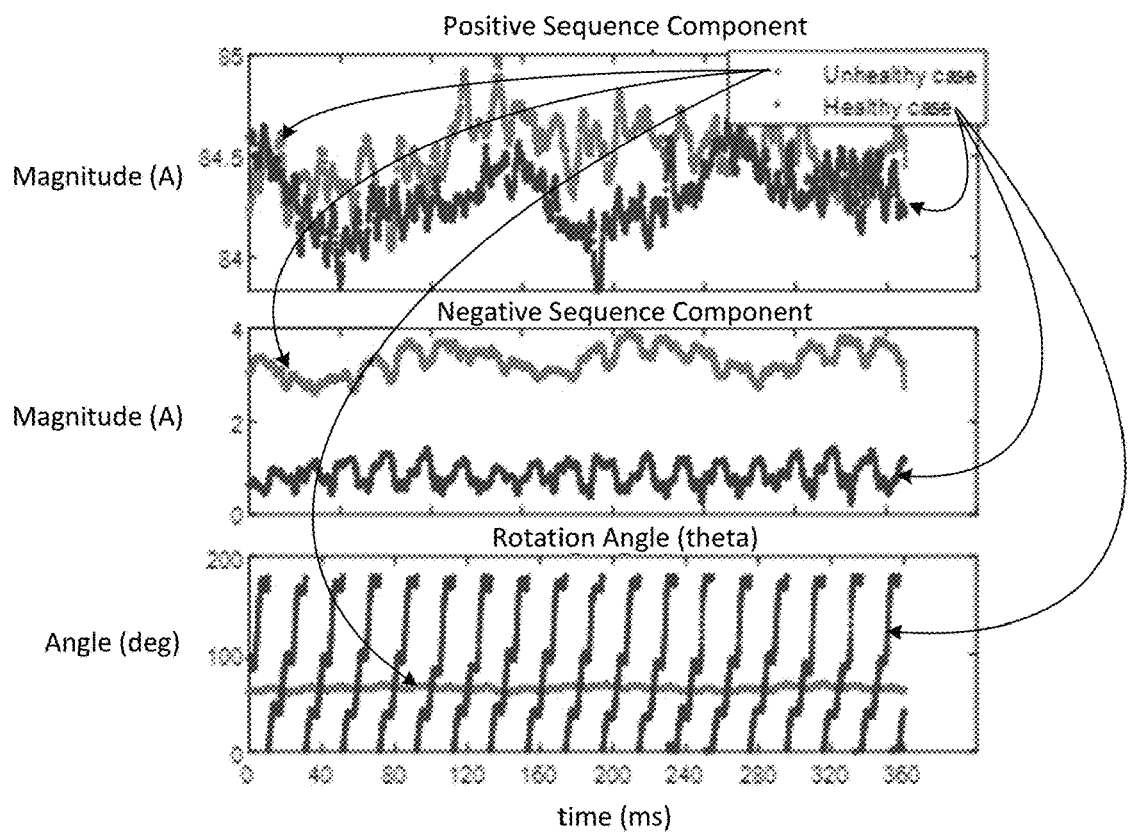
FIG. 7 is an exemplary schematic diagram illustrating magnitudes of a positive sequence component and a negative sequence component and angles of a circle and an ellipse for a healthy case and an unhealthy case according to some embodiments of inventive concepts.

FIG. 7 is a graph of the positive sequence (top), negative sequence (middle) and rotation angle (bottom) using the data in the example of FIGS. 5A, 5B and 6.

As shown in FIG. 7 and Table 3, the positive sequence component $I_1$ may fluctuate between 84 A (Ampere) and 85 A either the unhealthy case or in the healthy case, while the negative sequence component $I_2$ may be higher, between 3 A and 4 A, in the unhealthy case, and may be less than 1.5 A in the healthy case. In the unhealthy case, the rotation angle θ may be about 65° which indicates that the unbalanced type is $D_a$, corresponding to a continuous drop in the magnitude of the phasor Pa. This indicates a fault location in the stator winding 40*a* of the motor 40. In contrast, the rotation angle θ in the healthy case is zero, since the graph of $I_a$ vs $I_b$ is circular.

TABLE 3

Positive and Negative Sequence Averages

| | $I_1$ (A) | $I_2$ (A) | θ° | Unbalanced Type |
|---|---|---|---|---|
| Healthy Case | 84.59 | 0.79 | 0 | balanced |
| Unhealthy Case | 84.21 | 3.03 | 61.17 | $D_a$ |

Identification of Inverter Fault

In some embodiments, the fault type and/or the fault location in the electric motor system 10 may include a fault type and/or a fault location in the inverter 32 of the electric motor system 10. The three current components $I_a$, $I_b$ and $I_c$ may include the terminal currents $I_{i,a}$, $I_{i,b}$ and $I_{i,c}$ in the inverter 32, and hence the fault type and/or the fault location in the electric motor system 10 may include a short circuit or open circuit failure mode of the inverter 32 of the electric motor system 10. The short circuit or open circuit failure mode of the inverter 32 of the electric motor system 10 may be due to a fault in inverter switches $S_1$ to $S_6$, referring to FIG. 3. A short circuit switch failure may lead to destruction of the inverter 32 due to induced uncontrolled currents while an open circuit switch failure may result in secondary failures to the inverter 32 due to dramatically changed load currents.

Figure 8:
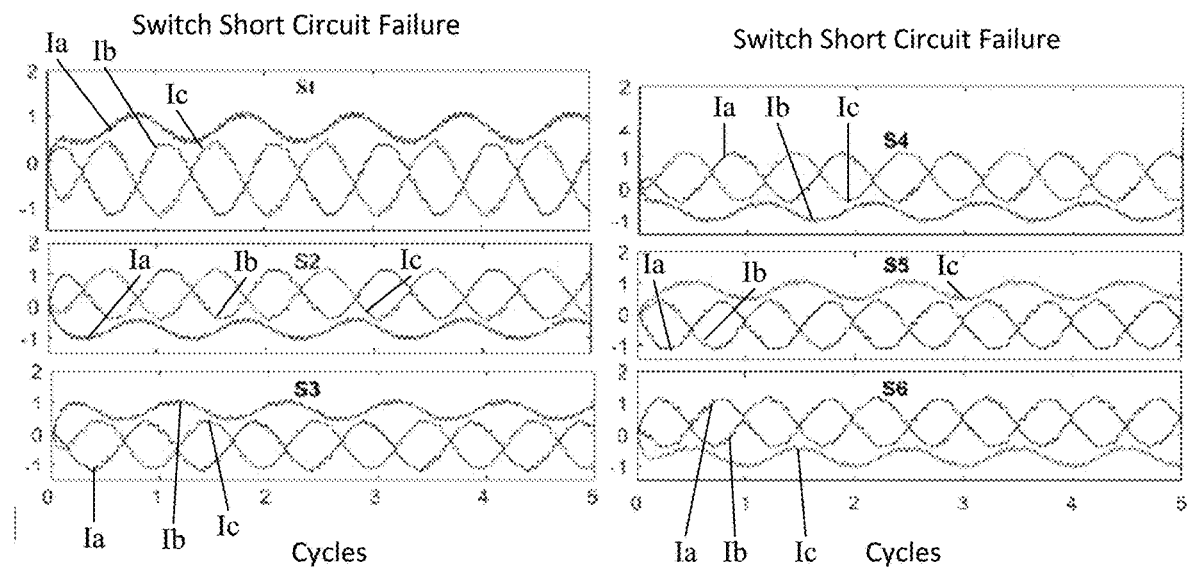
FIG. 8 is an exemplary schematic diagram illustrating current waveforms associated with an inverter due to short circuit failures in different switches according to some embodiments of inventive concepts.
Figure 9:
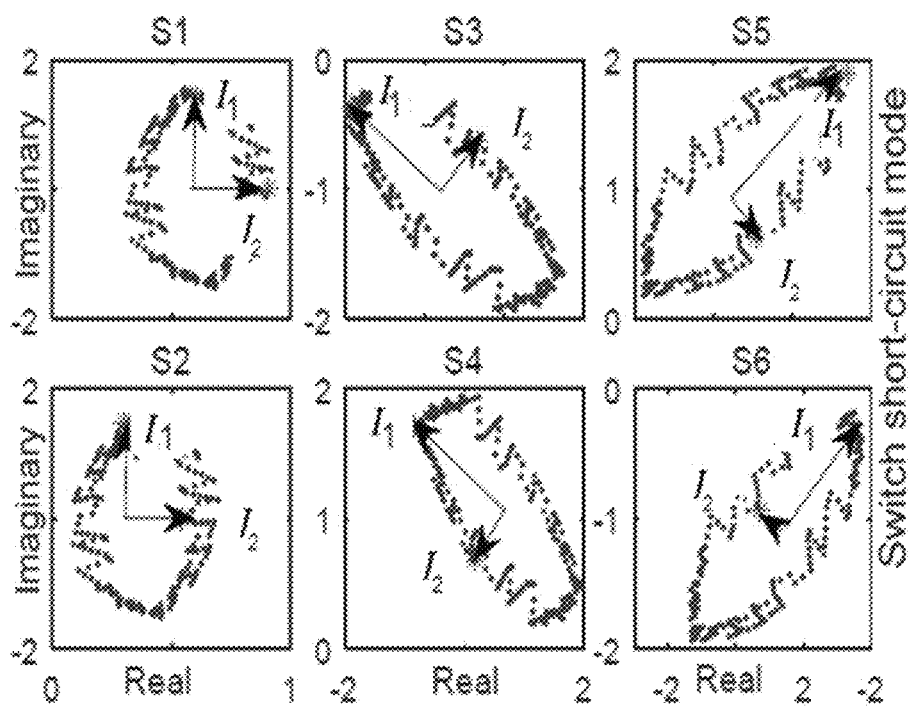
FIG. 9 is an exemplary schematic diagram illustrating quadrants occupied by an ellipse in an αβ plane for different switches in a short circuit mode according to some embodiments of inventive concepts.
Figure 10:
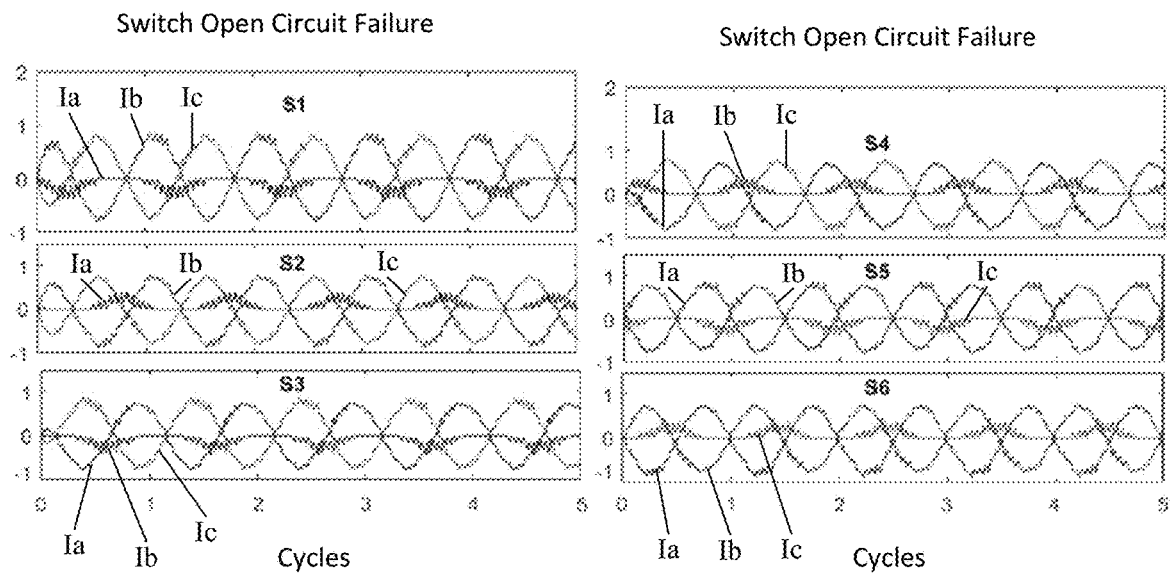
FIG. 10 is an exemplary schematic diagram illustrating current waveforms associated with an inverter due to open circuit failures in different switches according to some embodiments of inventive concepts.
Figure 11:
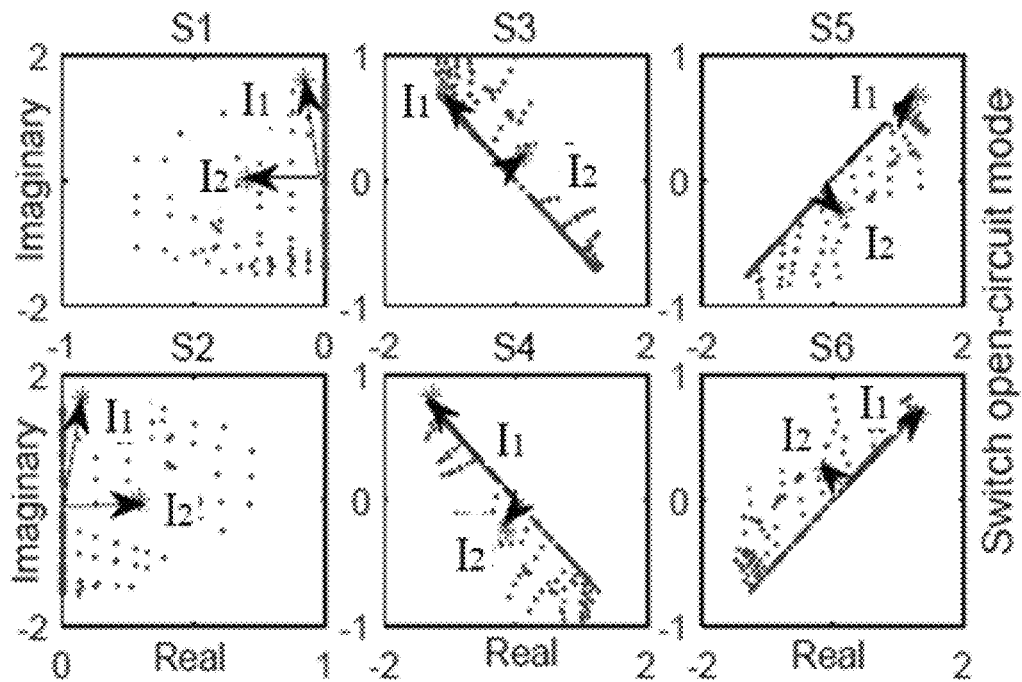
FIG. 11 is an exemplary schematic diagram illustrating quadrants occupied by an ellipse in an αβ plane for different switches in an open circuit mode according to some embodiments of inventive concepts.

FIGS. 8 and 10 illustrate current waveforms associated with the inverter 32 due to short (FIG. 8) and open (FIG. 10) circuit failures in different switches. The fault type and/or the fault location in the inverter 32 of the electric motor system 10 may be determined, via the determining module 3024 of the electric control unit 302, based on the eigenvalues of the covariance matrix B, and further based on the polar quadrants I-IV occupied by the ellipse of the plot of $I_α$ vs $I_β$ in the α-β plane, as shown in FIGS. 9 and 11. In other words, the short circuit or open circuit failure mode may be determined, via the determining module 3024 of the electric control unit 302, based on the rotation angle θ and the polar quadrants I-IV occupied by the ellipse in the α-β plane.

For example, a fault may be determined, via the determining module 3024 of the electric control unit 302, to be a short circuit failure mode if the rotation angle θ and occupied quadrants fall into one of the categories indicated in Table 4:

TABLE 4

Short Circuit Failure Mode

| Faulty Switch | Occupied Quadrants | θ° |
|---|---|---|
| $S_1$ | II, III | 90 |
| $S_2$ | I, IV | 90 |
| $S_3$ | I, III, IV | 60 |
| $S_4$ | I, II, III | 60 |

TABLE 4-continued

Short Circuit Failure Mode

| Faulty Switch | Occupied Quadrants | θ° |
|---|---|---|
| $S_5$ | I, II, IV | 120 |
| $S_6$ | II, III, IV | 120 | where $S_1$ to $S_6$ represent switches in the inverter 32, I to IV represent the quadrants occupied by the ellipse in the α-β plane, and θ represents the rotation angle. Specifically, as shown in FIG. 3, the inverter 32 may include first, second and third legs 32*a*, 32*b*, 32*c*, each leg of the inverter 32 may generate one phase of the three-phase current waveform, the switches $S_1$ and $S_2$ may be in the first leg 32*a*, the switches $S_3$ and $S_4$ may be in the second leg 32*b*, and the switches $S_5$ and $S_6$ may be in the third leg 32*c*. For example, referring to FIG. 3, when the rotation angle θ is 60° and the occupied quadrants are I, III and IV, it indicates that the switch $S_3$ in the first leg 32*a* may be short circuited.

In another example, a fault may be determined, via the determining module 3024 of the electric control unit 302, to be an open circuit failure mode when the occupied quadrants and rotation angle θ fall into a category indicated in Table 5:

TABLE 5

Open Circuit Failure Mode

| Faulty Switch | Occupied Quadrants | θ° |
|---|---|---|
| $S_1$ | II, III | 90 |
| $S_2$ | I, IV | 90 |
| $S_3$ | IV, I, II | 30 |
| $S_4$ | II, III, IV | 30 |
| $S_5$ | I, III, IV | 150 |
| $S_6$ | I, II, III | 150 |

For example, referring to FIG. 3, when the rotation angle θ is 30° and the occupied quadrants are I, II and IV, it indicates that the switch $S_3$ in the first leg 32*a* may be open circuited. Accordingly, open circuit and short circuit failures in inverter switches due to gradual aging and switching frequency of the switches may be determined in real-time, so as to reduce or avoid unwanted vehicle downtime by performing maintenance service in advance.

Figure 12A:
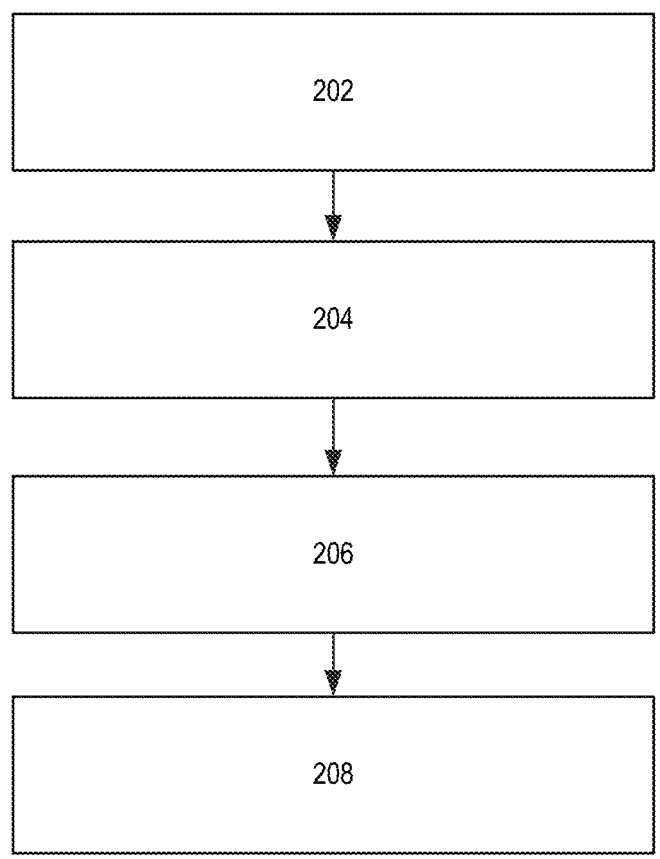
FIG. 12A is an exemplary flowchart diagram illustrating operations of a method for monitoring an electric motor system according to some embodiments of inventive concepts.
Figure 12B:
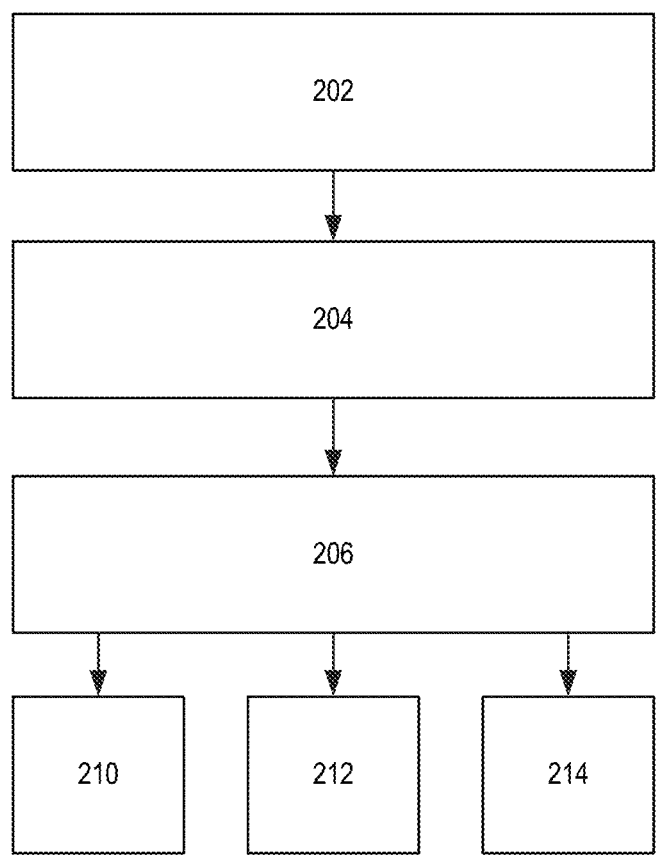
FIG. 12B is an exemplary flowchart diagram illustrating operations of a method for monitoring an electric motor system according to some embodiments of inventive concepts.

According to some embodiments, the electric control unit 302 may further comprise a sampling module 3021, as shown in FIG. 1B. FIG. 12A is a flowchart of operations according to some embodiments. As shown therein, a method for monitoring an electric motor system 10 includes obtaining, via the sampling module 3021 of the electric control unit 302, samples of a three-phase current waveform associated with the electric motor system 10 (block 202) and transforming, via the transforming module 3022 of the electric control unit 302, the samples of the three-phase current waveform into a matrix of two orthogonal signals $I_α$ and $I_β$ (block 204). A covariance matrix is generated, via the generating module 3023 of the electric control unit 302, from the matrix of the two orthogonal signals $I_α$ and $I_β$ (block 206), and a fault type and/or a fault location in the electric motor system 10 is determined, via the determining module 3024 of the electric control unit 302, based on the covariance matrix (block 208). For example, as shown in FIG. 12B, a fault type is determined, via the determining module 3024 of the electric control unit 302, based on the covariance matrix (block 210); a fault location in the electric motor system 10 is determined, via the determining module 3024 of the electric control unit 302, based on the covariance matrix (block 212); and a fault severity in the electric motor system 10 is determined, via the determining module 3024 of the electric control unit 302, based on the covariance matrix (block 214).

Figure 14:
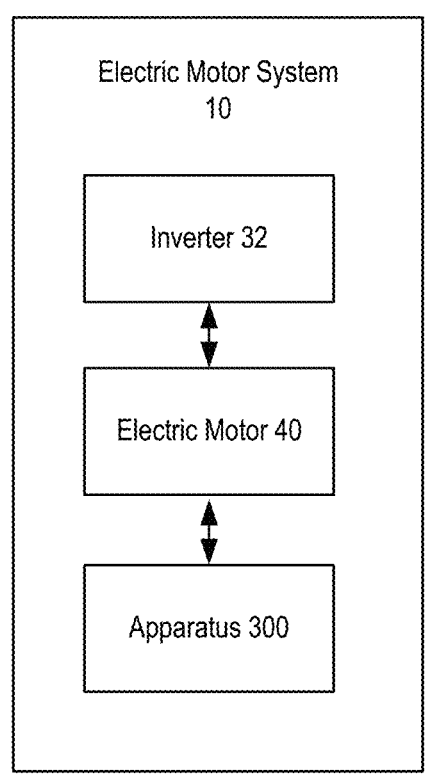
FIG. 14 is an exemplary schematic diagram illustrating an electric motor system having an apparatus for monitoring an inverter and an electric motor of the motor drive system according to some embodiments of inventive concepts.

FIG. 13 illustrates an apparatus 300 for monitoring the electric motor system 10 may also be provided. The apparatus 300 may include an electric control unit 302 and a memory 306 coupled to the electric control unit 302, and the memory 306 may store computer-executable instructions that when executed by the electric control unit 302 may cause the apparatus 300 to perform operations of the method as recited above. The apparatus 300 may further include a current sensor 304 for detecting the inverter currents and/or motor currents described above. The apparatus 300 may further include a transmitting unit 308 for transmitting the alert described above. The electric motor system 10 may further include the apparatus 300, as illustrated in FIG. 14. Alternatively, the inverter 32 may also be provided to include the apparatus 300.

Figure 15:
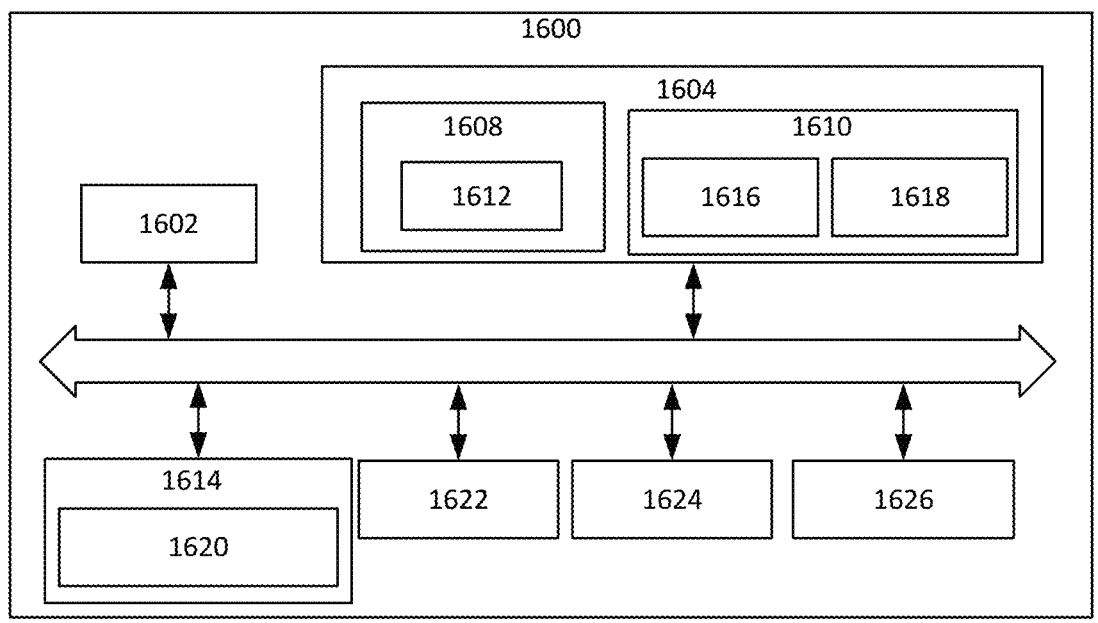
FIG. 15 is a schematic diagram of an exemplary computer system for implementing examples disclosed herein, according to one example.

FIG. 15 is a schematic diagram of a computer system 1600 for implementing examples disclosed herein. The computer system 1600 is adapted to execute instructions from a computer-readable medium to perform these and/or any of the functions or processing described herein. The computer system 1600 may be connected (e.g., networked) to other machines in a LAN, an intranet, an extranet, or the Internet. While only a single device is illustrated, the computer system 1600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1600 may comprise at least one computing device or electronic device capable of including firmware, hardware, and/or executing software instructions to implement the functionality described herein. The computer system 1600 may include a processor device 1602 (may also be referred to as a control unit), a memory 1604, and a system bus 1606. The computer system 1600 may include at least one computing device having the processor device 1602. The system bus 1606 provides an interface for system components including, but not limited to, the memory 1604 and the processor device 1602. The processor device 1602 may include any number of hardware components for conducting data or signal processing or for executing computer code stored in memory 1604. The processor device 1602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 1606 may be any of several types of bus structures that may further interconnect to a memory bus (with or without a memory controller), a peripheral bus, and/or a local bus using any of a variety of bus architectures. The memory 1604 may be one or more devices for storing data and/or computer code for completing or facilitating methods described herein. The memory 1604 may include database components, object code components, script components, or other types of information structure for supporting the various activities herein. Any distributed or local memory device may be utilized with the systems and methods of this description. The memory 1604 may be communicably connected to the processor device 1602 (e.g., via a circuit or any other wired, wireless, or network connection) and may include computer code for executing one or more processes described herein. The memory 1604 may include non-volatile memory 1608 (e.g., read-only memory (ROM), erasable programmable read-only memory (EPROM), electrically erasable programmable read-only memory (EEPROM), etc.), and volatile memory 1610 (e.g., random-access memory (RAM)), or any other medium which can be used to carry or store desired program code in the form of machine-executable instructions or data structures and which can be accessed by a computer or other machine with a processor device 1602. A basic input/output system (BIOS) 1612 may be stored in the non-volatile memory 1608 and can include the basic routines that help to transfer information between elements within the computer system 1600.

The computer system 1600 may further include or be coupled to a non-transitory computer-readable storage medium such as the storage device 1614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 1614 and/or in the volatile memory 1610, which may include an operating system 1616 and/or one or more program modules 1618. All or a portion of the examples disclosed herein may be implemented as a computer program product 1620 stored on a transitory or non-transitory computer-usable or computer-readable storage medium (e.g., single medium or multiple media), such as the storage device 1614, which includes complex programming instructions (e.g., complex computer-readable program code) to cause the processor device 1602 to carry out the steps described herein. Thus, the computer-readable program code can comprise software instructions for implementing the functionality of the examples described herein when executed by the processor device 1602. The processor device 1602 may serve as a controller or control system for the computer system 1600 that is to implement the functionality described herein.

The computer system 1600 also may include an input device interface 1622 (e.g., input device interface and/or output device interface). The input device interface 1622 may be configured to receive input and selections to be communicated to the computer system 1600 when executing instructions, such as from a keyboard, mouse, touch-sensitive surface, etc. Such input devices may be connected to the processor device 1602 through the input device interface 1622 coupled to the system bus 1606 but can be connected through other interfaces such as a parallel port, an Institute of Electrical and Electronic Engineers (IEEE) 1394 serial port, a Universal Serial Bus (USB) port, an IR interface, and the like. The computer system 1600 may include an output device interface 1624 configured to forward output, such as to a display, a video display unit (e.g., a liquid crystal display (LCD) or a cathode ray tube (CRT)). The computer system 1600 may also include a communications interface 1626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method for monitoring an electric motor system, the method comprising:
    obtaining, via an electric control unit, samples of a three-phase current waveform associated with the electric motor system;
    transforming, via the electric control unit, the samples of the three-phase current waveform into two orthogonal signals;
    generating, via the electric control unit, a covariance matrix from the two orthogonal signals; and
    determining, via the electric control unit, a fault type and a fault location in the electric motor system based on the covariance matrix.

2. The method of claim 1, wherein the samples of the three-phase current waveform comprise samples from a complete cycle of a fundamental frequency of the three-phase current waveform.

3. The method of claim 1, further comprising:
    generating, via the electric control unit, an alert indicating the fault type and/or the fault location.

4. The method of claim 1, wherein transforming the samples of the three-phase current waveform into the matrix of the two orthogonal signals comprises applying a Clarke transformation to the samples of the three-phase current waveform.

5. The method of claim 1, wherein determining the fault type and/or the fault location in the electric motor system based on the covariance matrix comprises determining the fault type and/or the fault location in the electric motor system based on eigenvalues of the covariance matrix.

6. The method of claim 5, wherein determining the fault type and/or the fault location in the electric motor system based on the eigenvalues of the covariance matrix comprises determining the fault type and/or the fault location in the electric motor system based on a rotation angle of an ellipse in an $\alpha$-$\beta$ plane, and wherein the ellipse is generated by plotting the eigenvalues in the $\alpha$-$\beta$ plane.

7. The method of claim 6, wherein the three-phase current waveform comprises three current components, wherein each current component corresponds to a respective phase of the three-phase current waveform, wherein the fault type and/or the fault location in the electric motor system comprises an unbalanced condition of stator currents in an electric motor of the electric motor system, wherein the three current components comprise the stator currents in the electric motor, and wherein the unbalanced condition is determined based on the rotation angle.

8. The method of claim 7, further comprising:
    determining, via the electric control unit, a fault severity of the unbalanced condition based on values of a positive sequence component and a negative sequence component, wherein the positive sequence component and the negative sequence component are generated based on the eigenvalues.

9. The method of claim 8, further comprising:
generating, via the electric control unit, an alert indicating the fault severity.

10. The method of claim 9, wherein the alert is generated in response to the fault severity being greater than a threshold level.

11. The method of claim 7, wherein the unbalanced condition is determined further based on a length of a semi-minor axis of the ellipse and a length of a semi-major axis of the ellipse.

12. The method of claim 1, wherein the three-phase current waveform comprises three current components, wherein each current component corresponds to a respective phase of the three-phase current waveform, wherein the fault type and/or the fault location in the electric motor system comprises a fault type and/or a fault location in an electric motor of the electric motor system, and wherein the three current components comprise stator currents in the electric motor.

13. The method of claim 6, wherein determining the fault type and/or the fault location in the electric motor system based on the eigenvalues of the covariance matrix comprises determining the fault type and/or the fault location in the electric motor system further based on quadrants occupied by the ellipse in the $\alpha$-$\beta$ plane.

14. The method of claim 13, wherein the three-phase current waveform comprises three current components, wherein each current component corresponds to a respective phase of the three-phase current waveform, wherein the fault type and/or the fault location in the electric motor system comprises a short circuit or open circuit failure mode of an inverter of the electric motor system, wherein the three current components comprise terminal currents in the inverter, and wherein the short circuit or open circuit failure mode is determined based on the rotation angle and the quadrants occupied by the ellipse in the $\alpha$-$\beta$ plane.

15. The method of claim 1, wherein the three-phase current waveform comprises three current components, wherein each current component corresponds to a respective phase of the three-phase current waveform, wherein the fault type and/or the fault location in the electric motor system comprises a fault type and/or a fault location in an inverter of the electric motor system, and wherein the three current components comprise terminal currents in the inverter.

16. The method of claim 1, wherein the electric motor system includes an inverter and an electric motor, and wherein the inverter is for converting a direct current (DC) voltage to a three-phase alternating current (AC) voltage for powering the electric motor.

17. An apparatus for monitoring an electric motor system, the apparatus comprising:
an electric control unit; and
a memory coupled to the electric control unit, the memory storing computer-executable instructions that, when executed by the electric control unit, cause the apparatus to perform operations the method as recited in claim 1.

18. An inverter comprising the apparatus as recited in claim 17.

19. An electric motor system, comprising:
an inverter configured to convert a direct current (DC) voltage into a three-phase alternating current (AC) voltage;
a three-phase electric motor coupled to the inverter and configured to generate mechanical rotation in response to the three-phase AC voltage; and
an apparatus as recited in claim 17 coupled to the inverter and the three-phase electric motor.

20. An electric motor drive system configured to drive a three-phase electric motor that generates mechanical rotation in response to a three-phase alternating current (AC) voltage, the electric motor drive system comprising:
an inverter configured to convert a direct current (DC) voltage into the three-phase alternating current (AC) voltage; and
a predictive maintenance unit coupled to the inverter and the three-phase electric motor and configured to perform the method as recited in claim 1.

* * * * *